US012691899B2

(12) United States Patent
Wade et al.

(10) Patent No.: US 12,691,899 B2
(45) Date of Patent: Jul. 28, 2026

(54) SYSTEMS AND METHODS FOR DETERMINING DECELERATION CONTROLS

(71) Applicant: Zoox, Inc., Foster City, CA (US)

(72) Inventors: Joshua Caleb Wade, Redwood City, CA (US); Joshua Dean Egbert, Redwood City, CA (US); Vincent Andreas Laurense, Foster City, CA (US); George Chunfeng Chen, El Monte, CA (US); Amirhossein Tamjidi, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 161 days.

(21) Appl. No.: 18/592,014

(22) Filed: Feb. 29, 2024

(65) Prior Publication Data

US 2025/0276715 A1 Sep. 4, 2025

(51) Int. Cl.
*B60W 60/00* (2020.01)
*B60W 30/14* (2006.01)

(52) U.S. Cl.
CPC ........ *B60W 60/001* (2020.02); *B60W 30/143* (2013.01); *B60W 2720/10* (2013.01); *B60W 2720/106* (2013.01)

(58) Field of Classification Search
CPC ........... B60W 60/001; B60W 60/0011; B60W 60/0013; B60W 60/0015; B60W 60/0018; B60W 30/0956; B60W 30/181; B60W 2554/80; B60W 2554/802; B60W 30/09;

B60W 30/18154; B60W 30/18109; B60W 30/143; B60W 2552/53; B60W 30/18159; B60W 2510/18; B60W 2720/10;
(Continued)

(56) References Cited

U.S. PATENT DOCUMENTS

| | | | | |
|---|---|---|---|---|
| 12,174,637 B1 * | 12/2024 | Okamoto | .............. | G05D 1/0214 |
| 2013/0297168 A1 * | 11/2013 | Svensson | .............. | B60T 8/1755 |
| | | | | 701/70 |

(Continued)

FOREIGN PATENT DOCUMENTS

| | | |
|---|---|---|
| CN | 112758093 A | 5/2021 |
| EP | 0661188 A1 | 7/1995 |

(Continued)

OTHER PUBLICATIONS

Search Report and Written Opinion for related International Application No. PCT/US25/17188, dated Jun. 10, 2025, 11 pages.

*Primary Examiner* — Abby Lin
*Assistant Examiner* — Kayla R Doros
(74) *Attorney, Agent, or Firm* — Lee & Hayes, P.C.

(57) ABSTRACT

Systems and techniques for determining deceleration controls to use in a trajectory for use in stopping a vehicle are described. A vehicle control system may determine if a stopping point is represented in a spatially-generated trajectory (e.g., controls to be commanded at particular locations) and, if so, whether the points in the trajectory approaching the stopping point meet near-stop conditions. If so, the system operated the vehicle in stop vehicle control mode, generating temporally-based controls to slow the vehicle more comfortably. Otherwise, the system operates the vehicle as normal, using spatially-based controls for controlling the vehicle.

20 Claims, 6 Drawing Sheets

200 —

(58) Field of Classification Search
     CPC ....... B60W 2720/106; B60W 2720/103; B60T
                    2230/04; B60T 2201/03; G05D 1/0223;
                                              B60K 2360/172
     See application file for complete search history.

(56)                    References Cited

U.S. PATENT DOCUMENTS

| 2015/0073661 | A1  | 3/2015  | Raisch et al.             |
| 2020/0216044 | A1* | 7/2020  | Chow .................... B60T 8/171 |
| 2021/0171040 | A1* | 6/2021  | Grubwinkler ... B60W 30/18018 |
| 2022/0314999 | A1* | 10/2022 | Williams ........... B60W 60/001 |
| 2022/0348227 | A1* | 11/2022 | Foster ................... B60Q 1/507 |
| 2024/0051573 | A1* | 2/2024  | Clawson .......... B60W 30/0956 |

FOREIGN PATENT DOCUMENTS

| JP | 2022134876 | A  | 9/2022 |
| KR | 101714276  | B1 | 3/2017 |

* cited by examiner

200 ⌐

400 —↘

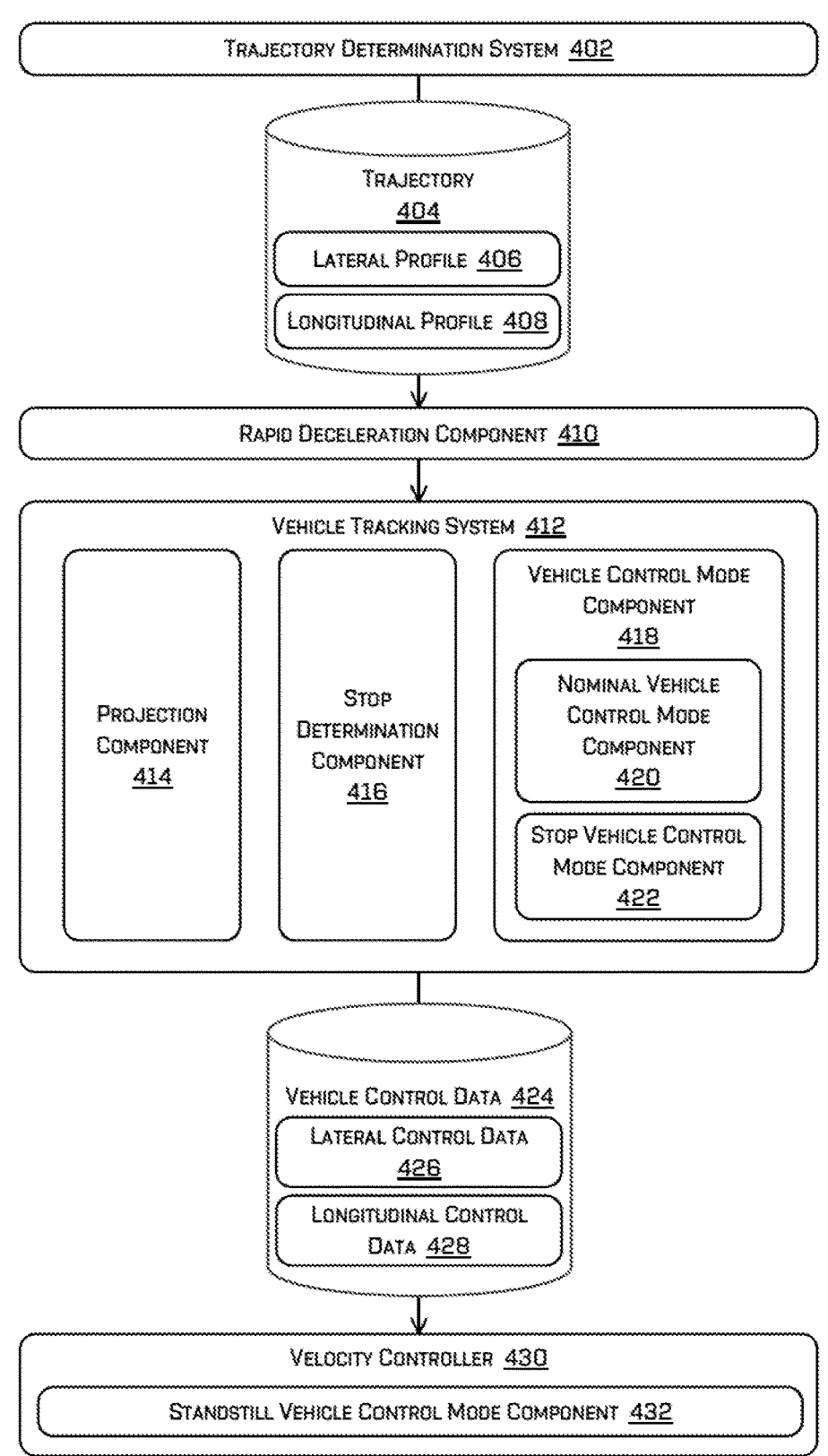

TRAJECTORY DETERMINATION SYSTEM 402

TRAJECTORY 404

LATERAL PROFILE 406

LONGITUDINAL PROFILE 408

RAPID DECELERATION COMPONENT 410

VEHICLE TRACKING SYSTEM 412

PROJECTION COMPONENT 414

STOP DETERMINATION COMPONENT 416

VEHICLE CONTROL MODE COMPONENT 418

NOMINAL VEHICLE CONTROL MODE COMPONENT 420

STOP VEHICLE CONTROL MODE COMPONENT 422

VEHICLE CONTROL DATA 424

LATERAL CONTROL DATA 426

LONGITUDINAL CONTROL DATA 428

VELOCITY CONTROLLER 430

STANDSTILL VEHICLE CONTROL MODE COMPONENT 432

FIG. 4

SYSTEMS AND METHODS FOR DETERMINING DECELERATION CONTROLS

BACKGROUND

Vehicles may be equipped with a trajectory planning system that determines an operational trajectory for the vehicle that may be used to control a vehicle as it travels within an environment. Included in such trajectories may be stopping points for planned stops (e.g., stops at stop signs and traffic signals, parking, letting passengers enter or exit the vehicle, etc.). A vehicle traveling through an environment using such a trajectory may decelerate as it approaches a planned stopping point. However, determining deceleration controls that maintain customer safety and comfort may be challenging. Maintaining a consistent deceleration until the vehicle reaches a stop may result in passenger discomfort as the braking pressure needed to further slow the vehicle during deceleration decreases. The vehicle may also abruptly come to a stop with consistent deceleration, resulting in an uncomfortable "bounce back" or jerk when the vehicle stops. However, insufficient deceleration may cause the vehicle to stop beyond the intended stopping point, potentially creating a hazardous condition. Maintaining passenger comfort and safety while operating a vehicle during deceleration to a stop may, at times, present challenges.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 4 is a block diagram of an example vehicle control system, in accordance with examples of the disclosure.

DETAILED DESCRIPTION

Figure 1:
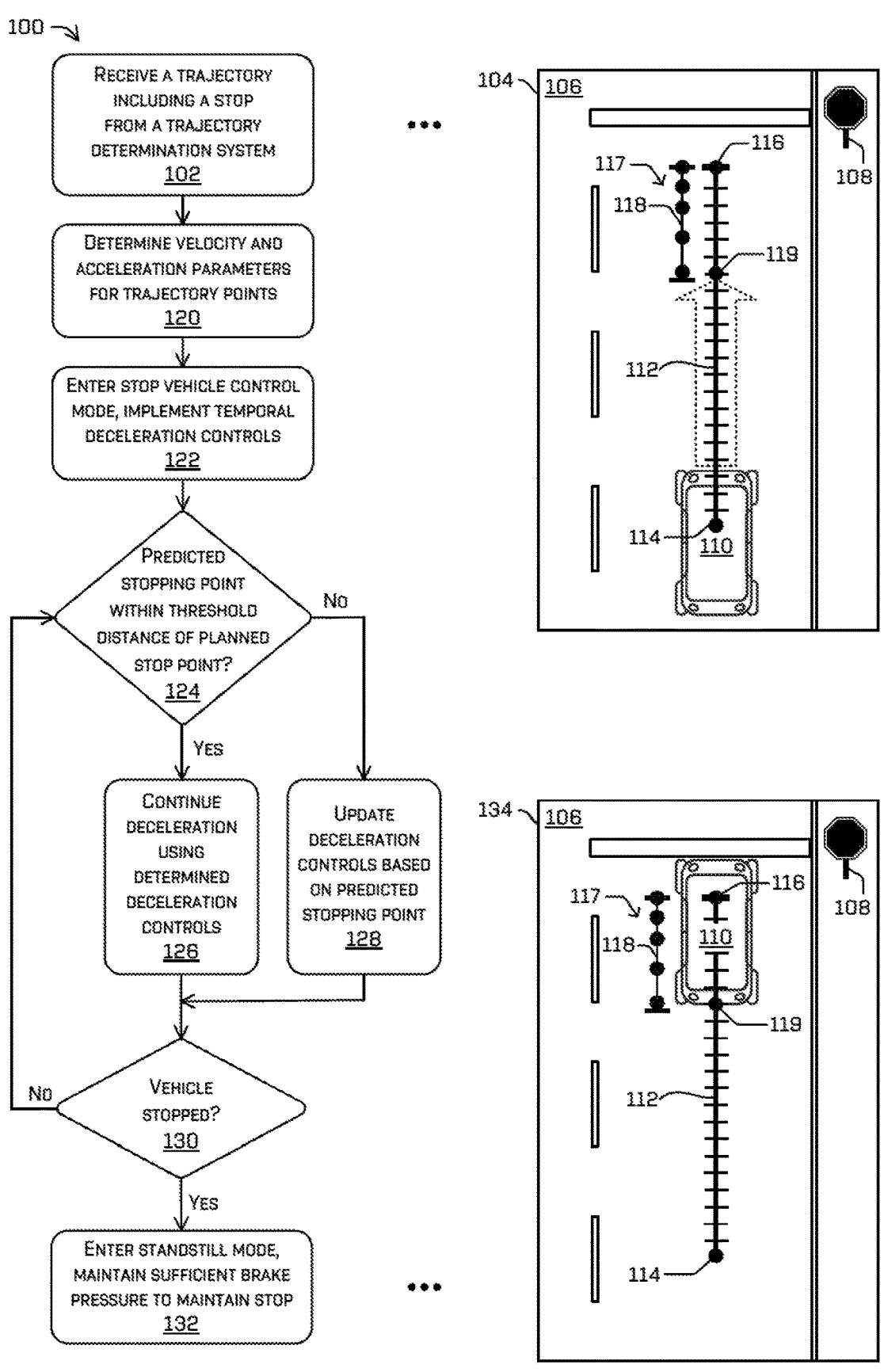
FIG. 1 illustrates an example process for determining and implementing controlled deceleration in a vehicle, in accordance with examples of the disclosure.

A vehicle may be capable of implementing various levels of deceleration, for example, by applying various amounts of braking pressure. The use of different levels of deceleration may have associated impacts on vehicle performance and passenger comfort. The various techniques described herein may be used to determine appropriate deceleration (e.g., braking) controls to bring a vehicle comfortably and safely to a stop. Systems and techniques for determining velocity controls, acceleration controls, and other deceleration controls based on various criteria to use to perform controlled deceleration of a vehicle to a stop are discussed herein. As used herein, a "deceleration control" may refer to any one or more instructions, commands, and other data that may be used to instruct or otherwise control a vehicle component to (e.g., attempt to) operate the vehicle at a particular velocity and/or acceleration.

In various examples, a vehicle computing system may execute a vehicle tracking system to determine various controls to be implemented at one or more vehicle components. These controls may be used to control a vehicle along a path based on velocities and accelerations determined by the vehicle tracking system. The vehicle tracking system may determine or receive a trajectory for operating the vehicle in an environment, where the trajectory includes a region of travel for a vehicle and, in some examples, a stopping point along the region of travel. This trajectory may be provided to the vehicle tracking system by a trajectory determination system (e.g., that may, in some examples, also be executed by the vehicle computing system).

A trajectory may include a lateral profile representing directional parameters (e.g., steering controls) and/or a longitudinal profile representing velocity parameters (e.g., velocity, acceleration, deceleration, and/or braking controls). A trajectory may be based on spatial data (may be referred to as a "spatial trajectory") that includes controls based on spatial locations. In some examples, a trajectory may include a planned, expected, or otherwise known stopping point (e.g., at a particular location), such as at a stop sign or a passenger drop-off area. A stopping point may be a point at which a vehicle is intended to have zero velocity and/or at which a stopping maneuver is to be performed (e.g., to bring the vehicle to a stop and/or control the vehicle to be stationary). Alternatively, a trajectory may not include a stopping point and may instead be associated with continuous vehicle travel through a region of travel. Unexpected objects detected in an environment, such as those that may cross or be predicted to cross a path of intended vehicle travel, may cause the vehicle to perform a rapid deceleration and potentially an unplanned stop. A rapid deceleration component may interoperate with the vehicle tracking system to generate controls and/or instruct the vehicle tracking system to generate controls for avoiding intersection with such unexpected objects. The vehicle tracking system and its various associated components may address intended or otherwise planned stopping points.

In various examples, to address these intended or otherwise planned stops represented in a trajectory, a vehicle tracking system may include a stop determination component that may be configured to identify one or more stopping points in a trajectory. The vehicle tracking system may further include a vehicle control mode determination component that may be configured to determine a vehicle control mode for operating the vehicle at various points along a trajectory, including portions of the trajectory proximate to a stopping point. Based on the identified stopping point and current, projected and/or predicted vehicle conditions, the vehicle tracking system may determine to use a nominal vehicle control mode component to generate vehicle controls for vehicle motion according to a trajectory or a stop vehicle control mode component to generate time-based (temporal) vehicle controls for bringing the vehicle to a stop according to a stopping point represented in a trajectory.

In examples, a trajectory may include data representing points in space (e.g., in a representation of an environment in which a vehicle may be traveling) that are associated with vehicle operating states, such as velocity, acceleration, and stops. For example, the trajectory may indicate a vehicle's velocity and acceleration for a particular spatial point (e.g., location) in the environment. The vehicle tracking system may use such trajectory data to determine the controls to be implemented at various vehicle components to cause the vehicle to be in a particular state when the vehicle is present at a corresponding location. Determining the controls to place a vehicle in particular states corresponding to particular locations along a trajectory using spatial data may become more challenging as the vehicle's speed is reduced, with such determinations being most difficult when the vehicle is not in motion (e.g., at zero speed). In particular, ensuring that a level of deceleration is implemented at a vehicle using spatially-based controls may be increasingly difficult as the vehicle's velocity diminishes to zero and control points spatially converge. Therefore, it may be advantageous to use temporal data to determine vehicle controls when the vehicle is at low speed or stopped.

In examples, the vehicle tracking system may use a received trajectory and projected vehicle locations along such a trajectory to determine whether the vehicle is spatially proximate to a stopping point. When the vehicle is not sufficiently spatially proximate to a stopping point (e.g., within a threshold distance of a stopping point), the vehicle tracking system may use a nominal vehicle control mode component to generate instructions (e.g., velocity and/or acceleration controls) for vehicle motion for a velocity controller based on the trajectory (e.g., may operate the vehicle in a nominal vehicle control mode). When the vehicle is sufficiently proximate to a stopping point (e.g., based on velocity, acceleration, and/or location relative to the stopping point), the vehicle tracking system may use a stop vehicle control mode component to generate instructions (e.g., velocity and/or acceleration controls) for a velocity controller based on temporal data (e.g., may operate the vehicle in a stop vehicle control mode).

The vehicle tracking system may use a stop determination component in conjunction with a projection component to determine a vehicle control mode. The stop determination component may determine if a (e.g., current) trajectory in use at the vehicle tracking system is a stopping trajectory. In examples, data associated with the trajectory may indicate whether the trajectory is a stopping trajectory, such as one or more trajectory parameters. Alternatively or additionally, the stop determination component may determine if there is a stop indicated in the trajectory. A stop may be indicated explicitly as a stop and/or may be determined based on one or more vehicle state attributes (e.g., associated with a vehicle position or location), such as a vehicle velocity and/or acceleration being zero.

Alternatively or additionally, the stop determination component may determine that there is a stop or a zero velocity point along the trajectory that is accompanied by other conditions that may confirm it is a stopping point. For example, the stop determination component may determine that the acceleration also correlates to a stopping point (e.g., acceleration is zero or negative until reaching zero at the point). The stop determination component may also, or instead, determine that proximate subsequent (e.g., spatially contiguous) points in the trajectory are not associated with a non-zero velocity. For example, where the trajectory represents a slowing of the vehicle to a point and a subsequent acceleration at a point immediately following that point, the stop determination component may determine that that point is not a stopping point.

If the stop determination component determines that the (e.g., current) trajectory is a stopping trajectory (e.g., includes a stopping point), the stop determination component may evaluate projected vehicle locations and predicted vehicle states at such locations to determine if and where along the trajectory to enter a stop vehicle control mode. The projection component may determine a projected vehicle location and/or other predicted state data for the vehicle at various points along the trajectory. For example, the projection component may determine a predicted velocity and/or acceleration for the vehicle at one or more spatial points represented in the trajectory. These spatial points may represent a current vehicle location and/or projected vehicle locations along the trajectory. The stop determination component may compare these predicted values to corresponding threshold values to determine if the vehicle should operate in a stop vehicle control mode at the corresponding points.

For example, the stop determination component may determine, for one or more points represented in a trajectory (e.g. the point associated with the current position of the vehicle), if the predicted velocity for a particular point is less than or equal to a near-stop velocity threshold (e.g., 0.1 m/s, 0.25 m/s, 0.5 m/s, etc.). The stop determination component may also, or instead, determine, for such one or more points, if the predicted acceleration for a particular point is less than or equal to a near-stop acceleration threshold (e.g., $-0.01$ $m/s^2$, $-0.015$ $m/s^2$, $-0.0125$ $m/s^2$, etc.). If one or more such conditions are true, the stop determination component may determine that the vehicle is to be controlled in a stop vehicle control mode at the corresponding point. In examples, both the acceleration and the velocity at a particular point being at or below the corresponding thresholds may be required to operate the vehicle in the stop vehicle control mode. In further examples, the current trajectory being a stopping trajectory and both the acceleration and the velocity at a particular point being at or below the corresponding threshold may be required to operate the vehicle in the stop vehicle control mode. If the stop vehicle control mode conditions are not met, the stop determination component may determine to operate the vehicle in a nominal (e.g., normal) vehicle control mode, a rapid deceleration mode, and/or another mode of operation.

When the stop determination component determines that the vehicle is to be operated in stop vehicle control mode at a particular trajectory point, subsequent controls for the vehicle may be determined based on temporal data. For example, starting at the first point in a trajectory at which stop vehicle control mode is to be implemented, the vehicle tracking system may use the stop vehicle control mode component to determine vehicle component controls (e.g., instructions and/or data sent to a velocity controller) to be implemented at temporal control points based on temporal data. The vehicle tracking system may use the stop vehicle control mode component to determine controls based on temporal data for the temporal points along the path of the trajectory until the vehicle reaches a determined stopping point.

The controls generated in the stop vehicle control mode may be determined based on improving passenger comfort. For example, the stop vehicle control mode component may determine acceleration commands for the velocity controller that reduce braking pressure as the stopping point approaches (e.g., temporally) to prevent a sudden jerk or jolt from overapplication of brakes at the stopping point. For example, the acceleration commands may be configured at or below a sudden deceleration threshold to improve passenger comfort while the vehicle is brought to a stop.

The stop vehicle control mode component may determine such controls further based on data received during operation in stop vehicle control mode. For example, the stop vehicle control mode component may determine that a projected vehicle location at stopping is not the intended stopping location indicated in the trajectory. In response, the stop vehicle control mode component may adjust the determined temporal controls to improve the ultimate stopping position of the vehicle compared to the intended stopping location. For instance, the stop vehicle control mode component may determine velocity and acceleration controls for the time period beginning at the initial stop vehicle control mode trajectory point until the stopping point (e.g., the point associated with the predicted time of arrival at the stopping point).

In examples, the stop vehicle control mode component may determine, based on data received from other vehicle components (e.g., vehicle location data based on sensor data) and during operation in stop vehicle control mode, that the vehicle is likely to stop beyond the intended stopping point (e.g., "overshoot" the stopping point). The stop vehicle control mode component may then modify or otherwise adjust the previously determined velocity and acceleration controls to cause the vehicle to stop sooner, and therefore closer to the intended stopping point. For example, the stop vehicle control mode component may decrease the acceleration controls or instructions sent to the velocity controller from those initially determined to cause the vehicle to decelerate more rapidly (e.g., increase vehicle deceleration).

Similarly, the stop vehicle control mode component may determine, based on data received from other vehicle components (e.g., vehicle location data based on sensor data) and during operation in stop vehicle control mode, that the vehicle is likely to stop before the intended stopping point (e.g., "undershoot" the stopping point). The stop vehicle control mode component may then adjust the previously determined velocity and acceleration controls to cause the vehicle to stop later, and therefore closer to the intended stopping point. For example, the stop vehicle control mode component may more gently decelerate the vehicle by reducing deceleration (e.g., increasing the acceleration controls or instructions sent to the velocity controller from those initially determined) to cause the vehicle to decelerate less rapidly.

In examples, the stop vehicle control mode component may transmit acceleration and/or velocity control data to the velocity controller (e.g., at times associated with the temporal control points determined by the stop vehicle control mode component), which may use such data to control the drive systems of the vehicle. For example, the stop vehicle control mode component may determine and transmit velocity and acceleration controls to the velocity controller for the duration of operation of the vehicle in the stop vehicle control mode. In examples, the stop vehicle control mode component may not transmit steering control data to the velocity controller or any other vehicle control components due to the brevity (in time and space) of vehicle operation in stop vehicle control mode. Alternatively, the stop vehicle control mode component may indicate to the velocity controller and/or one or more other vehicle control components to maintain a current steering configuration (e.g., the last steering configuration implemented in nominal vehicle control mode before entering stop vehicle control mode). In other examples, the stop vehicle control mode component may transmit steering control data to the velocity controller or any other vehicle control components.

In examples, upon reaching a stopping point, the velocity controller may enter a "standstill" mode, where the velocity controller may cause sufficient brake pressure to be applied to the vehicle's brakes so that the vehicle does not move, even after the velocity of the vehicle has reached zero. The velocity controller may determine to enter this mode when it receives, for example from the stop vehicle control mode component, an indication (e.g., command, instruction, etc.) of a zero velocity or a velocity below a threshold. In some examples, the velocity controller may be configured to enter standstill mode after being at zero velocity or below a threshold standstill velocity for a threshold amount of time (e.g., 0.5 s, 1 s, 2 s, etc.). Alternatively or additionally, the vehicle tracking system, or a component thereof, such as the stop vehicle control mode component, may transmit a standstill mode instruction to the velocity controller. Standstill mode may be a temporally-based mode that is used to control the vehicle (e.g., to remain stationary) for a time period and/or based on a time.

The systems and techniques described herein may be directed to leveraging trajectory data, velocity parameters, acceleration parameters, and other data to enable a vehicle, such as an autonomous vehicle, to more accurately control a vehicle based on a trajectory that includes a stopping point while improving passenger comfort and safety. These determined deceleration controls may facilitate safer navigation through an environment and improved vehicle control during the implementation of vehicle deceleration. In particular examples, the systems and techniques described herein can utilize data structures containing data representing a predicted region of travel, current and/or predicted positions of a vehicle and/or objects in an environment, environmental and/or vehicle conditions, lateral and/or longitudinal profiles, and/or any other trajectory data, velocity data, acceleration data, and/or associated data. By using the deceleration control determination techniques described herein to more accurately determine deceleration controls for a trajectory that may include a stopping point, the examples described herein may result in increased safety and accuracy of vehicle control, especially vehicle stopping operations, thereby allowing an autonomous vehicle to more safely operate in an environment. For example, the techniques described herein may be faster and/or more robust than conventional techniques, as they may increase the ability of an autonomous vehicle to safely navigate in an environment and more smoothly implement deceleration operations to reach a stopping point (which may, in turn, provide more comfortable rider experiences while ensuring safe operation of the vehicle). That is, techniques described herein provide a technological improvement over existing vehicle trajectory and deceleration determination technology.

The techniques described herein may also improve the operation of computing systems and increase resource utilization efficiency. For example, computing systems, such as vehicle computing systems, may more efficiently perform trajectory and deceleration control determinations using the techniques described herein because the disclosed examples may reduce the amount of trajectory data needed to generate velocity and acceleration controls and reduce the amount of processing required to determine deceleration controls for a velocity controller in vehicle stopping scenarios. Furthermore, computing systems, such as vehicle computing systems, may more efficiently perform trajectory and deceleration control determination operations based on temporal data rather than spatial data, thereby requiring less processing to determine acceleration controls under particular conditions than would be required using conventional techniques where a trajectory and its associated deceleration controls are generated based largely on spatial data.

The systems and techniques described herein can be implemented in a number of ways. Example implementations are provided below with reference to the following figures. Although the disclosed techniques may be discussed in the context of an autonomous vehicle, the techniques described herein can be applied to a variety of systems (e.g., a semi-autonomous vehicle, a manually operated vehicle, a sensor system, a robotic platform, etc.) and are not limited to autonomous vehicles. In another example, the techniques can be utilized in an aviation or nautical context, or in any system involving vehicle or object trajectories and/or deceleration control and/or implementation point determination operations. Further, although aspects of the disclosed systems and techniques may be discussed in the context of originating with particular types of trajectory and/or sensor data and processing with particular types of components, data and data structures as described herein can include any two-dimensional, three-dimensional, or multi-dimensional data and data associated with any types of trajectories and any types of sensors (e.g., cameras, lidar, radar, sonar, time-of-flight, and the like). Additionally, the systems and techniques described herein can be used with real data (e.g., captured using sensor(s)), simulated data (e.g., generated by a simulator, training data, and the like), or any combination thereof.

Figure 7:
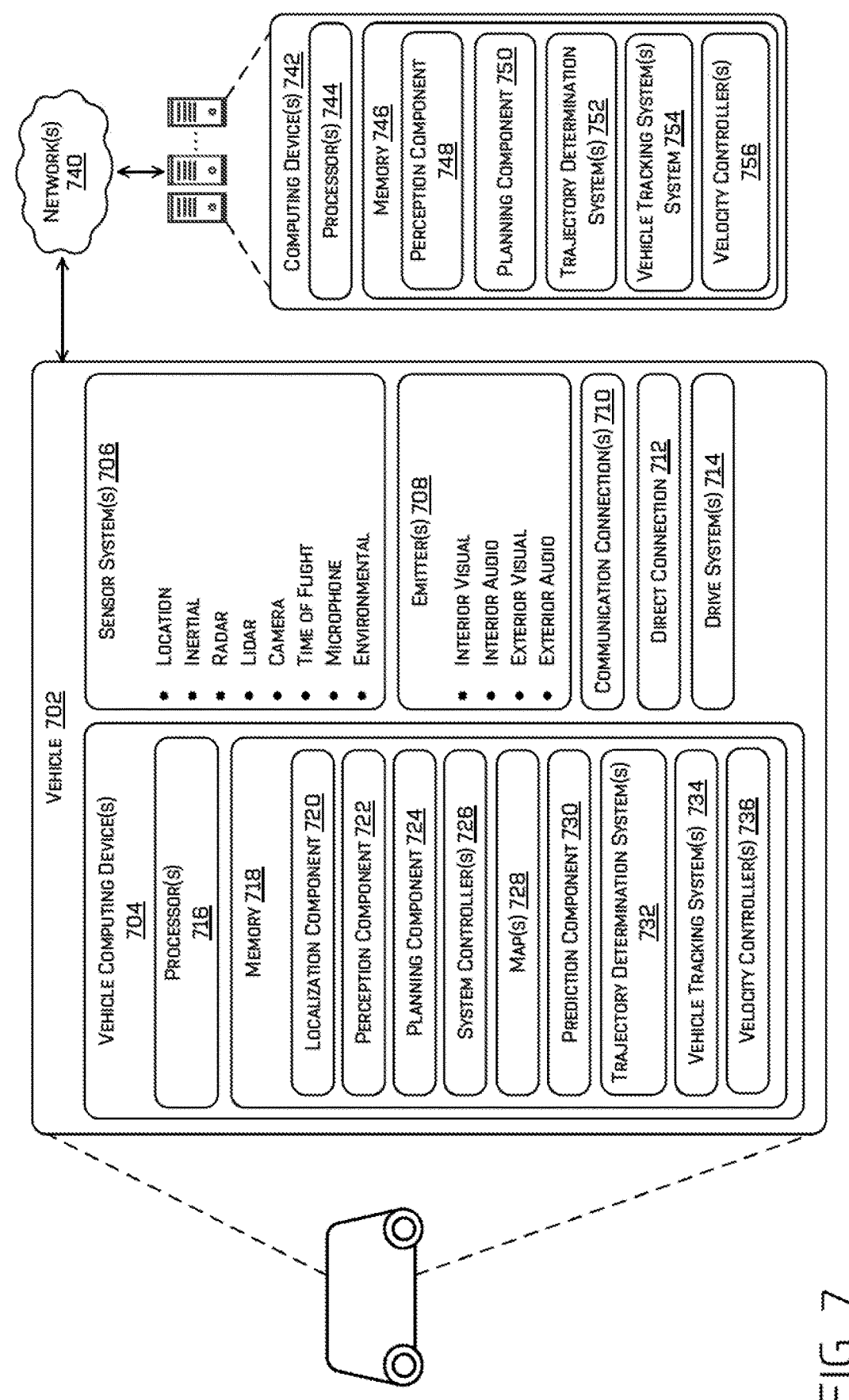
FIG. 7 depicts a block diagram of an example system for implementing the techniques described herein.

FIG. 1 is a pictorial flow diagram of an example process 100 for determining deceleration controls based on a vehicle trajectory and providing such controls to one or more vehicle components for use in controlling a vehicle. In examples, one or more operations of the process 100 may be implemented by a vehicle computing system, such as by using one or more of the components and systems illustrated in FIGS. 4 and 7 and described below. For example, one or more components and systems can include those associated with vehicle control system 400 illustrated in FIG. 4 and/or any one or more components configured therein. Such one or more components and systems can also, or instead, include processors 716 and/or 744, memories 718 and/or 746, trajectory determination system(s) 732, vehicle tracking system 734, and/or velocity controller(s) 736 illustrated in FIG. 7. In examples, the one or more operations of the process 100 may be performed by a remote system in communication with a vehicle, such as trajectory determination system(s) 752, vehicle tracking system(s) 754, and/or velocity controller(s) 756 illustrated in FIG. 7. In still other examples, the one or more operations of the process 100 may be performed by a combination of a remote system and a vehicle computing systems. However, the process 100 is not limited to being performed by such components and systems, and the components and systems of FIGS. 4 and 7 are not limited to performing the process 100.

At operation 102, a vehicle control system, for example executing at or in communication with a vehicle computing system, may determine or otherwise receive a vehicle trajectory for use in controlling a vehicle traveling in an environment. For example, a trajectory determination system may determine or generate a spatial trajectory that may be transmitted to a vehicle tracking system. This trajectory may include data indicating an intended and/or predicted region of travel for the vehicle in the environment, a position (e.g., a current position) of the vehicle in the environment, and one or more vehicle controls, such as steering controls, acceleration controls, velocity controls, braking controls, and/or other vehicle control information that may be implemented by the vehicle computing system at particular locations (e.g., particular spatial points) along the trajectory to control the vehicle. Trajectory data may include lateral profile data representing directional parameters (e.g., steering controls) and/or longitudinal profile data representing parameters associated with velocity (e.g., velocity, acceleration, deceleration, and/or braking controls). In various examples, a trajectory may also include vehicle, operational, and/or environmental condition data and/or detection data (e.g., associated with one or more objects and/or features detected within the environment). The trajectory received at operation 102 may be based on a planned route or path of travel and may include one or more planned or otherwise intended stopping points.

An example 104 illustrates a top-down view of an environment in which a vehicle 110 may be traveling. The vehicle 110 may be traveling on a roadway 106 in the direction indicated by the dashed arrow based on a trajectory 112. The vehicle 110 may be traveling toward an object 108 that may be a stop sign. The trajectory 112 may include a stopping point 116 (e.g., that may have been included in the trajectory 112 based on detection of, or data (e.g., map data) indicating, the stop sign object 108). A trajectory determination system executed at the vehicle 110 (e.g., by a vehicle computing system configured at the vehicle 110) may determine the trajectory 112 (lateral and longitudinal profile for trajectory 112). The trajectory 112 may include one or more acceleration and velocity parameters that may be associated with particular spatial points along the trajectory 112. For example, the individual spatial points represented on the trajectory 112 may an associated with particular velocity and/or acceleration parameters (e.g., projected velocity and/or acceleration controls to be implemented at corresponding spatial points).

For instance, the vehicle 110 may be at a current location point 114 of the trajectory 112. The current location point 114 may be associated with the vehicle 110's current velocity and acceleration (e.g. velocity and acceleration controls). The stopping point 116 of the trajectory 112 may be associated with a zero velocity parameter and/or a zero acceleration parameter (e.g. a zero velocity control and/or a zero acceleration control). Points in between these points along the trajectory may be associated with decreasing velocity parameters (e.g., decreasing velocity controls from the current location point 114 to the stopping point 116). Stop mode section 118 of the trajectory 112 may represent the section of the trajectory 112 at which the vehicle will enter and operate according to a stop vehicle control mode. For example, based on the velocity and/or acceleration parameters associated with point 119 (e.g., determined when the vehicle 110 reaches the location of the point 119), the vehicle tracking system may determine to control the vehicle 110 using stop vehicle control mode, as described herein. The acceleration and velocity controls of the vehicle 110 along this stop mode section 118 of the trajectory 112 may be generated for temporal control points 117 in this section.

At operation 120, the vehicle control system may determine the velocity and acceleration parameters for the various locations (e.g., spatial control points) represented in the trajectory. The vehicle control system may also, or instead, determine other parameters associated with the trajectory points, such as location. The vehicle control system may use this point data to determine whether to control the vehicle in a stop vehicle control mode. For example, as described in more detail herein, the vehicle control system may determine whether any one or more points represented in the trajectory are associated with an acceleration that is at or below a vehicle stop control mode acceleration threshold and/or a velocity that is at or below a vehicle stop control mode velocity threshold. The vehicle control system may also, or instead, determine whether any other data associated with the trajectory indicates that the trajectory may be a stopping trajectory. For example, the trajectory may be associated with various parameters, one or more of which may explicitly indicate that the trajectory includes one or more stopping points.

Referring again to the example 104, a vehicle control system of the vehicle 110 may determine velocity and acceleration parameters (e.g., projected controls) for the individual points represented by the trajectory 112 (e.g., for all points in the trajectory 112 and/or from a current vehicle location point to the final point (e.g., point 116) in the trajectory). In particular, the vehicle control system of the vehicle 110 may determine that the velocity and the acceleration indicated at stopping point 116 are zero. The vehicle control system of the vehicle 110 may further determine that the acceleration parameter associated with the point 119 is at or below a vehicle stop control mode acceleration threshold. The vehicle control system of the vehicle 110 may further determine that a velocity parameter associated with the point 119 is at or below a vehicle stop control mode velocity threshold. The vehicle control system of the vehicle 110 may also determine that the velocity and acceleration parameters associated with (e.g., all) points between the point 119 and the stopping point 116 are at or below the corresponding thresholds. The vehicle control system of the vehicle 110 may additionally determine that the velocity and acceleration parameters between the point 119 and the current location point 114 are (e.g., all) greater than the corresponding thresholds. Based on these determinations, the vehicle control system of the vehicle 110 may determine to operate the vehicle 110 in a stop vehicle control mode using controls implemented at the temporal control points 117 associated with the stop mode section 118 of the trajectory 112.

In examples, the vehicle control system of the vehicle 110 may evaluate a current point in the trajectory 112 to determine whether to operate the vehicle 110 in a stop vehicle control mode. For instance, if the vehicle control system determines that the velocity and acceleration parameters of the current spatial control point at which the vehicle is located do not meet the stop vehicle control mode criteria, the vehicle control system may operate the vehicle in nominal vehicle control mode. However, if the vehicle control system determines that the velocity and acceleration parameters of the current spatial control point at which the vehicle is located do meet the stop vehicle control mode criteria, the vehicle control system may evaluate the remaining points in the trajectory through the stopping point to determine if those points meet the stop vehicle control mode criteria. If so, the vehicle control system may (e.g., immediately) begin operating the vehicle 110 in a stop vehicle control mode.

At operation 122, the vehicle control system may enter stop vehicle control mode and perform associated operations. Among such operations, the vehicle control system may determine temporal acceleration and velocity controls for the vehicle and temporal control points at which to implement such controls. For example, rather than determining velocity and acceleration controls based on predicted locations of the vehicle along the trajectory (e.g., spatial data), the vehicle control system may determine velocity and acceleration controls based on times of vehicle operation (e.g., temporal data, such as future times based on a current time). The vehicle controller may then implement these controls at the vehicle.

Referring again to the example 104, the vehicle control system of the vehicle 110 may determine a velocity and acceleration control for the point 119, which may serve as a beginning time for stop vehicle mode operation (e.g., time to at point 119. The vehicle controls system may determine velocity and acceleration controls for temporal control points for controlling the vehicle along the path between the point 119 and the stopping point 116. The time at which the vehicle 110 is projected to be at the stopping point 116 may be time $t_n$, where there may be n+1 temporal control points 117 associated with the stop mode section 118 of the trajectory 112 (e.g., the vehicle controller may determine velocity and acceleration controls for times $t_0$ . . . $t_n$).

The vehicle state may be detected and/or determined during the deceleration process. For example, a current vehicle location may be determined (e.g., based on sensor data) at various points along the vehicle path of travel during operation of the vehicle in stop vehicle control mode. At operation 124, the vehicle controller may determine whether the predicted stopping point corresponds sufficiently to the planned stopping point. In examples, the vehicle control system may compare the distance between a currently predicted stopping point and the location of the planned stopping point to a threshold to determine whether any adjustments to the temporally-based acceleration and velocity controls determined at operation 122 are needed. For instance, the vehicle control system may be configured with one or more overshoot and/or undershoot thresholds (e.g., may be a single stop location differential threshold) that may be used to determine whether the vehicle is predicted to stop within an acceptable distance of the planned stopping point.

If, at operation 124, the system determines that the predicted stopping point and the planned stopping point are within an acceptable (e.g., threshold) distance, at operation 126, the vehicle control system may continue to operate the vehicle based on the current set of time-based acceleration and velocity controls.

If, at operation 124, the system determines that the predicted stopping point and the planned stopping point are not within an acceptable (e.g., threshold) distance, at operation 128, the vehicle control system may update a set of time-based acceleration and velocity controls currently in use to control the vehicle. For example, if the vehicle is predicted to stop greater than a threshold distance before the planned stopping point, at operation 128, the vehicle control system may reduce the deceleration (increase the acceleration) represented by one or more of the acceleration controls. On the other hand, if the vehicle is predicted to stop greater than a threshold distance after the planned stopping point, at operation 128, the vehicle control system may increase the deceleration (reduce the acceleration) represented by one or more of the acceleration controls. Other changes may be implemented to the controls generated by the vehicle control system based on information and/or data determined, received, or obtained during operation in the stop vehicle control mode.

At operation 130, the vehicle control system may determine if the vehicle is stopped. For example, the vehicle control system may determine if the current vehicle velocity is zero. Alternatively or additionally, the vehicle control system may determine if the vehicle is at (or sufficiently proximate to) the planned stopping point. If the vehicle is not stopped, the vehicle control system may continue to operate the vehicle using the current (e.g., as initially determined upon entry into stop vehicle control mode at operation 122 and/or as updated at operation 128) set of temporally-based stop vehicle control mode acceleration and velocity controls and return to operation 124 to evaluate the predicted stopping point.

If, at operation 130, the vehicle control system determines that the vehicle is stopped and/or that a current vehicle location is at (or sufficiently proximate to) the planned stopping point, at operation 132, the vehicle control system may control the vehicle to maintain a stop at the current vehicle location. In examples, this may be operating the vehicle in a standstill mode, where sufficient brake pressure is applied to stop the vehicle from moving. This brake pressure may vary depending on the state of the vehicle. For example, if the vehicle is on a hill, there may be more brake pressure applied than if the vehicle is on a flat surface. In examples, this standstill mode may be implemented as soon as the vehicle velocity is determined to be at zero to prevent the vehicle from rolling downhill in the time between full stop and implementation of standstill mode.

An example 134 illustrates a top-down view of the environment of example 104, where the vehicle 110 may have stopped at or proximate to the stopping point 116 from the previous location at point 114, traveling along the trajectory 112. The vehicle 110 may have operated in stop vehicle control mode over stop mode section 118 using temporally-based velocity and acceleration controls implemented at the temporal control points 117 that may have been determined as described above in regard to example 104. As can be seen in this example, the vehicle 110 may be stopped at the stopping point 116, proximate to the stop sign object 108, as intended by the trajectory 112 and based on the controls generated during stop vehicle control mode for the points from the point 119 to the stopping point 116. Once at the stopping point 116, the vehicle control system of the vehicle 110 may control the vehicle 110 in standstill mode, ensuring that the vehicle 110 remains stopped, at least until one or more movement instructions or trajectories are received.

Figure 2:
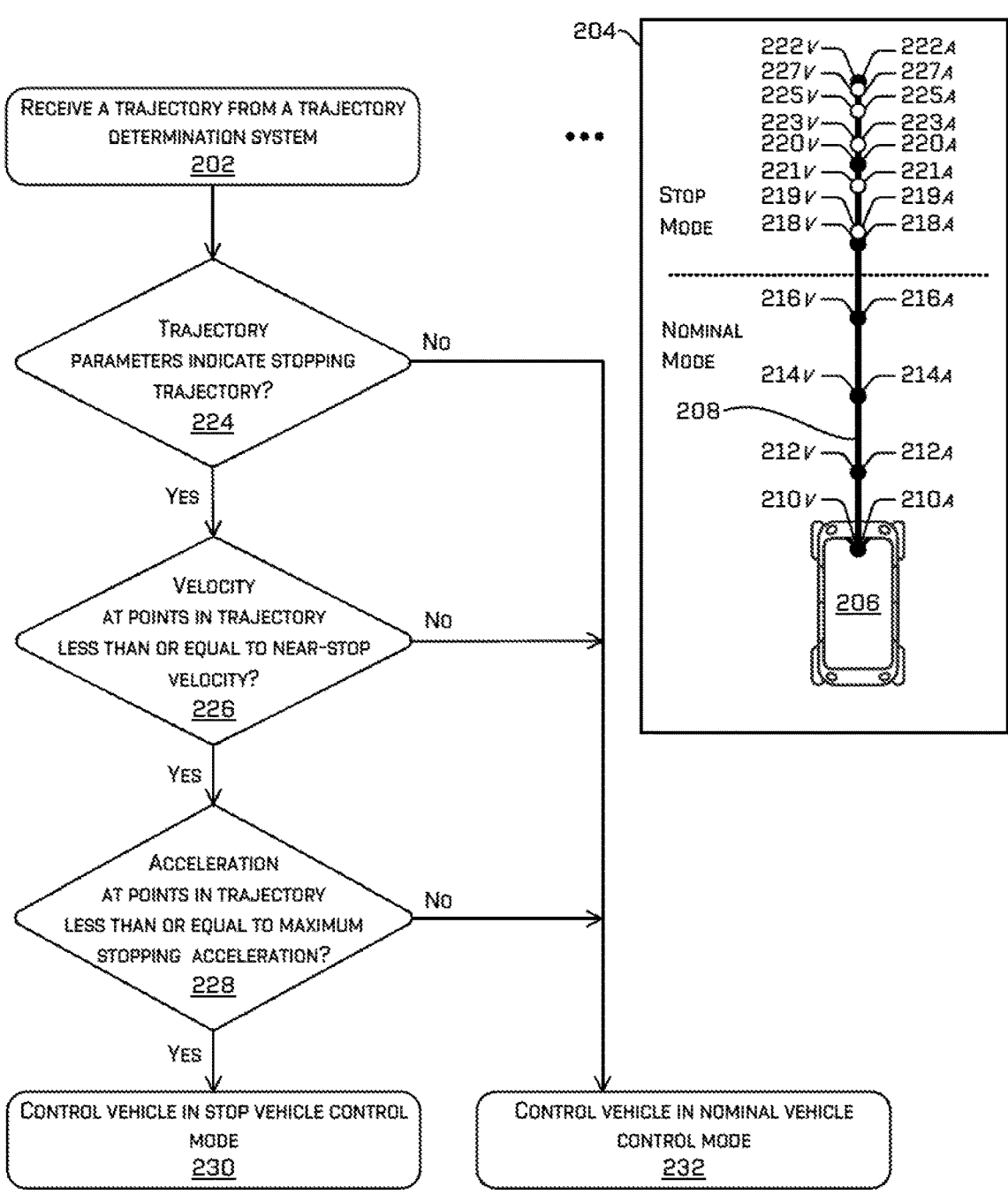
FIG. 2 illustrates an example process for determining and implementing vehicle control modes in a vehicle, in accordance with examples of the disclosure.

FIG. 2 is a pictorial flow diagram of an example process 200 for determining a vehicle control mode based on a vehicle trajectory for use in controlling a vehicle. In examples, one or more operations of the process 200 may be implemented by a vehicle computing system, such as by using one or more of the components and systems illustrated in FIGS. 4 and 7 and described below. For example, one or more components and systems can include those associated with vehicle control system 400 illustrated in FIG. 4 and/or any one or more components configured therein. Such one or more components and systems can also, or instead, include processors 716 and/or 744, memories 718 and/or 746, trajectory determination system(s) 732, vehicle tracking system 734, and/or velocity controller(s) 736 illustrated in FIG. 7. In examples, the one or more operations of the process 200 may be performed by a remote system in communication with a vehicle, such as trajectory determination system(s) 752, vehicle tracking system(s) 754, and/or velocity controller(s) 756 illustrated in FIG. 7. In still other examples, the one or more operations of the process 200 may be performed by a combination of a remote system and a vehicle computing systems. However, the process 200 is not limited to being performed by such components and systems, and the components and systems of FIGS. 4 and 7 are not limited to performing the process 200.

At operation 202, a vehicle control system, for example executing at or in communication with a vehicle computing system, may determine or otherwise receive a vehicle trajectory for use in controlling a vehicle traveling in an environment. For example, a trajectory determination system may determine or generate a trajectory that may be transmitted to a vehicle tracking system implemented at the vehicle control system. As noted herein, a trajectory may include data indicating an intended and/or predicted region of travel for the vehicle in the environment, a position (e.g., a current position) of the vehicle in the environment, and one or more vehicle controls, such as steering controls, acceleration controls, velocity controls, braking controls, and/or other vehicle control information that may be used by the vehicle computing system to control the vehicle. Such controls may be associated with particular spatial points in the trajectory.

An example 204 illustrates a top-down view of an environment in which a vehicle 206 may be traveling. The vehicle 206 may be controlled, at least partially, by a vehicle control system that may receive or otherwise determine a trajectory 208. The trajectory 208 may include one or more acceleration and velocity parameters that May be associated with particular points along the trajectory 208. These points may represent spatial locations within an environment. In this example, individual points 210, 212, 214, 216, 218, 220, and 222 are represented as filled dots along the trajectory 208. These points may be spatial control points and may individually have an associated velocity parameter and an associated acceleration parameter. For example, the point 210 may have a velocity 210$v$ and an acceleration 210$a$, the point 212 may have a velocity 212$v$ and an acceleration 212$a$, and so forth.

At operation 224, the vehicle control system may determine whether the trajectory is a stopping trajectory. In examples, the trajectory may have associated parameters (e.g., other than trajectory points and trajectory point parameters) that may include one or more explicit parameters that may indicate whether the trajectory is a stopping trajectory. Alternatively or additionally, the vehicle control system may determine that the trajectory is a stopping trajectory based, at least partially, on point data. For example, the vehicle control system may determine that there is a stop or a zero velocity point along the trajectory that may associated with other states or conditions that may confirm the stopping point. For instance, the vehicle control system may determine that the acceleration at a zero velocity point also correlates to a stopping point (e.g., acceleration is zero or negative). The vehicle control system may also, or instead, determine that proximate subsequent points in the trajectory are not associated with a non-zero velocity. For example, where the trajectory represents a slowing of the vehicle to a point and there is a subsequent acceleration at a point immediately following that point, the stop determination component may determine that that point is not a stopping point.

Referring again to the example 204, the vehicle control system may determine that the trajectory 208 is a stopping trajectory based on trajectory parameters and/or point parameters of points represented by the trajectory 208. For example, the vehicle control system may determine that the velocity 222$v$ of the point 222 is zero. The vehicle control system may further determine that there are no points after 222 with a non-zero velocity. Based on such data the vehicle control system may determine that the trajectory 208 is a stopping trajectory.

If, at operation 224, the vehicle control system determines that the trajectory is not a stopping trajectory, the vehicle control system may (e.g., continue to) operate the vehicle using normal processes and/or trajectory, such as operating the vehicle in a nominal vehicle control mode at operation 232.

If, at operation 224, the vehicle determines that the trajectory is a stopping trajectory, at operation 226 the vehicle control system may determine whether a subset of the points in the trajectory have a velocity less than or equal to a near-stop velocity threshold. For example, the vehicle control system may determine if the point at which the vehicle is currently located has a velocity less than or equal to the near-stop velocity threshold. If so, the vehicle control system may further determine if the remaining points in the trajectory also have velocities less than or equal to the near-stop velocity threshold. Alternatively, the vehicle control system may identify a first point in the trajectory having a velocity (e.g., projected velocity control parameter) less than or equal to the near-stop velocity threshold and then evaluate the remaining points beyond that point to determine if those points also have velocities less than or equal to the near-stop velocity threshold. In other words, the determination performed at operation 226 may be performed using a current location point and/or proactively upon identifying a future projected location point that has a qualifying velocity.

Referring again to the example 204, the vehicle control system may determine that the velocities of the points 210, 212, 214, and 216 are greater than a near-stop velocity threshold, but that the velocities of the points 218, 220, and 222 are less than the near-stop velocity threshold. In examples, the vehicle control system may evaluate these points repeatedly as the vehicle 206 progresses along the trajectory 208.

If, at operation 226, the vehicle control system determines that the current or at least some of the projected points in the trajectory do not have a velocity less than or equal to a near-stop velocity threshold, the vehicle control system may (e.g., continue to) operate the vehicle using normal processes and/or trajectory, such as operating the vehicle in a nominal vehicle control mode at operation 232.

If, at operation 226, the vehicle control system determines that the current and/or at least some of the points in the trajectory have a current or projected velocity less than or equal to a near-stop velocity threshold, at operation 228, the vehicle control system may determine whether a subset of the points in the trajectory has a current or projected acceleration less than or equal to a maximum stopping acceleration threshold. For example, the vehicle control system may determine if the point at which the vehicle is currently located has a current acceleration less than or equal to the maximum stopping acceleration threshold. If so, the vehicle control system may further determine if the remaining points in the trajectory have projected accelerations less than or equal to the maximum stopping acceleration threshold. Alternatively, the vehicle control system may identify a first point in the trajectory having an acceleration less than or equal to the maximum stopping acceleration threshold and then evaluate the remaining points beyond that point to determine if those points also have projected accelerations less than or equal to the maximum stopping acceleration threshold. In other words, as with the determination of operation 226, the determination performed at operation 228 may be performed using a current location point and/or proactively upon identifying a future projected location point that has a qualifying acceleration.

Referring again to the example 204, the vehicle control system may determine that the accelerations of the points 210, 212, 214, and 216 are greater than a maximum stopping acceleration threshold, but that the accelerations of the points 218, 220, and 222 are less than the maximum stopping acceleration threshold. Here again, the vehicle control system may evaluate these points repeatedly as the vehicle 206 progresses along the trajectory 208.

If, at operation 228, the vehicle control system determines that the current or at least some of the projected points in the trajectory do not have an acceleration less than or equal to a maximum stopping acceleration threshold, the vehicle control system may (e.g., continue to) operate the vehicle using normal processes and/or trajectory, such as operating the vehicle in a nominal vehicle control mode at operation 232.

If, at operation 228, the vehicle control system determines that the current and/or at least some of the projected points in the trajectory have an acceleration less than or equal to a maximum stopping acceleration threshold, at 230, the vehicle control system may operate the vehicle using a stop vehicle control mode.

For example, referring again to the example 204, the vehicle control system may determine that, because the accelerations and velocities of the points 218, 220, and 222 are at or under the respective thresholds and the trajectory 208 is a stopping threshold, the vehicle 206 may be operated in a stop vehicle control mode for the portion of the trajectory 208 that includes the points 218, 220, and 222. As noted above, the vehicle control system may make this determination upon arrival at the point 218 and based on determinations made using the parameters of that point, or proactively prior to arriving at the point 218. The vehicle control system may then generate temporal control points 219, 221, 223, 225, and 227 (indicated as unfilled dots in this example) to control the vehicle using time-based velocity and acceleration controls. For instance, the vehicle control system may generate a velocity control 219$v$ and an acceleration control 219$a$ for the temporal control point 219. These controls 219$v$ and 219$a$ may be implemented at the time associated with the temporal control point 219. Similar controls may be generated for the remaining temporal control points 221, 223, 225, and 227 shown in the example 204.

Figure 3:
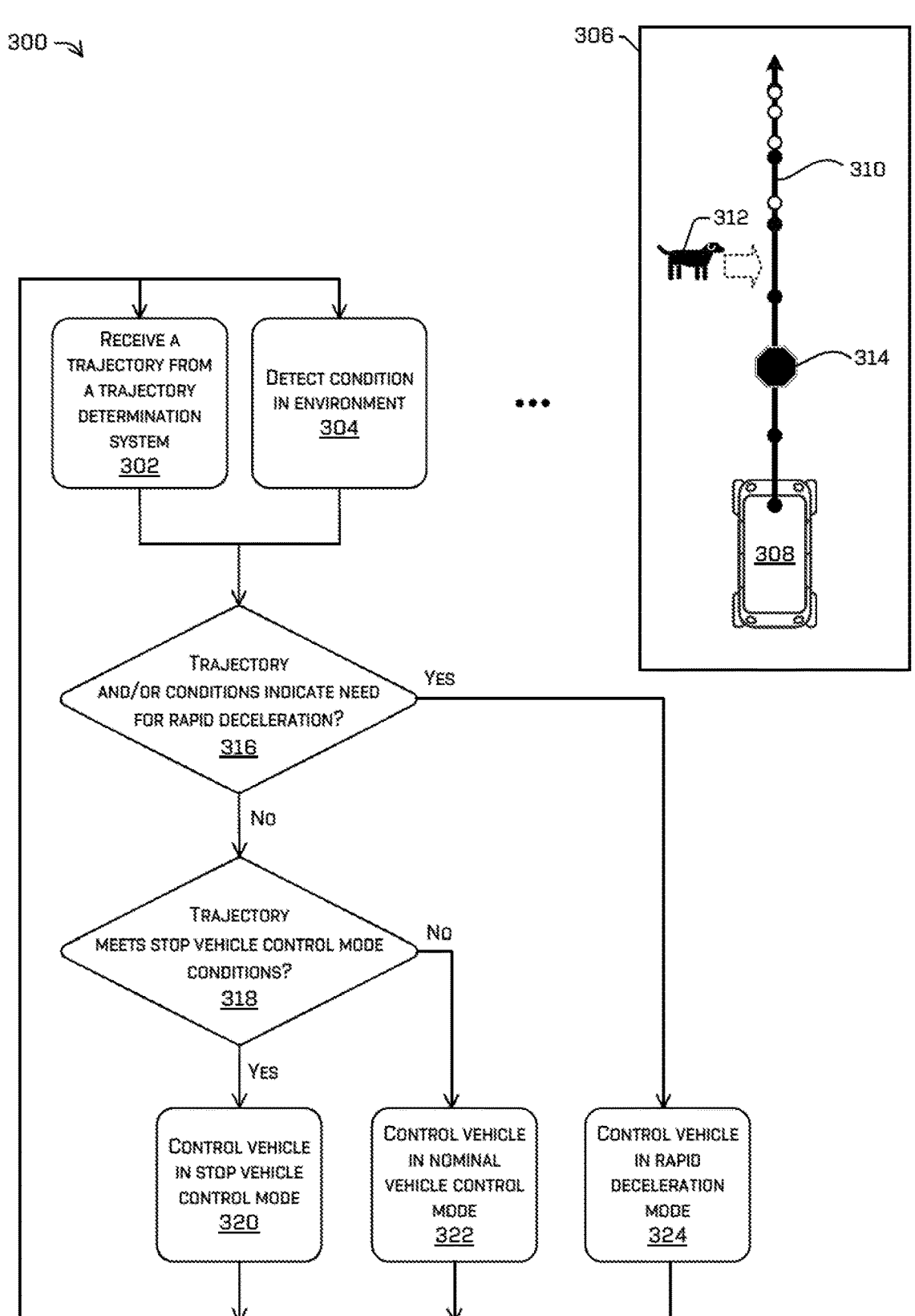
FIG. 3 illustrates another example process for determining and implementing vehicle control modes in a vehicle, in accordance with examples of the disclosure.

FIG. 3 is a pictorial flow diagram of an example process 300 for determining a vehicle control mode based on a vehicle trajectory and environmental data for use in controlling a vehicle. In examples, one or more operations of the process 300 may be implemented by a vehicle computing system, such as by using one or more of the components and systems illustrated in FIGS. 4 and 7 and described below. For example, one or more components and systems can include those associated with vehicle control system 400 illustrated in FIG. 4 and/or any one or more components configured therein. Such one or more components and systems can also, or instead, include processors 716 and/or 744, memories 718 and/or 746, trajectory determination system(s) 732, vehicle tracking system 734, and/or velocity controller(s) 736 illustrated in FIG. 7. In examples, the one or more operations of the process 300 may be performed by a remote system in communication with a vehicle, such as trajectory determination system(s) 752, vehicle tracking system(s) 754, and/or velocity controller(s) 756 illustrated in FIG. 7. In still other examples, the one or more operations of the process 300 may be performed by a combination of a remote system and a vehicle computing systems. However, the process 300 is not limited to being performed by such components and systems, and the components and systems of FIGS. 4 and 7 are not limited to performing the process 300.

At operation 302, a vehicle control system, for example executing at or in communication with a vehicle computing system, may determine or otherwise receive a vehicle trajectory for use in controlling a vehicle traveling in an environment. For example, a trajectory determination system may determine or generate a trajectory that may be transmitted to a vehicle tracking system implemented at the vehicle control system. As noted herein, a trajectory may include data indicating an intended and/or predicted region of travel for the vehicle in the environment, a position (e.g., a current position) of the vehicle in the environment, and one or more vehicle controls, such as steering controls, acceleration controls, velocity controls, braking controls, and/or other vehicle control information that may be used by the vehicle computing system to control the vehicle. Such controls may be associated with particular spatial points in the trajectory.

At operation 304, the vehicle may detect conditions within an environment. For example, the vehicle may be configured with various sensors and sensor systems that may detect objects and other aspects of an environment. Such aspects and objects may affect operation of the vehicle. For example, a vehicle may be controlled to stop before intersecting with an object detected in the environment or to move around such an object. In examples, operations 302 and 304 may be performed substantially simultaneously, while in other examples, these operations may be performed in any order.

An example 306 illustrates a top-down view of an environment in which a vehicle 308 may be traveling. The vehicle 308 may be controlled, at least partially, by a vehicle control system that may receive or otherwise determine a trajectory 310. The trajectory 310 may include one or more acceleration and velocity parameters that may be associated with particular spatial control points (represented as filled dots) along the trajectory 310. These points may represent spatial locations within an environment. These points may individually have an associated velocity parameter and an associated acceleration parameter. The vehicle control system of the vehicle 308 may also generate one or more temporal control points (represented as unfilled dots) that may be implemented along the path of the trajectory 310 at particular time, for example, based on operating the vehicle 308 in stop vehicle control mode. There may be a planned stopping point along the trajectory 310. There may be an object 312 (e.g., a dog) in the environment that may not be predicted or otherwise accounted for by the trajectory 310.

At operation 316, the vehicle control system may determine whether the trajectory and/or conditions in the environment indicate a need for a rapid deceleration (e.g., an urgent, unplanned, and/or emergency stop). For example, the vehicle control system may determine that an object has entered the path of the vehicle unexpectedly, such as a pedestrian, an animal, another vehicle, etc.

If a need for a rapid deceleration is determined at operation 316, at operation 324, the vehicle control system may control the vehicle in a rapid deceleration mode or otherwise implement rapid deceleration operations. Following this rapid deceleration, the vehicle control system may return to operation 302 to operate the vehicle based on a trajectory, such as an updated trajectory.

If there is no need for a rapid deceleration determined at operation 316, at operation 318, the vehicle control system may determine whether the trajectory received at operation 302 meets stop vehicle control mode conditions. For example, the vehicle control system may determine if the trajectory is a stopping trajectory and whether points in the trajectory have accelerations and velocities that fall at or below the respective stop vehicle control mode acceleration and velocity thresholds. If so, at operation 320, the vehicle control system may operate the vehicle in stop vehicle control mode, as described herein. Otherwise, if it is determined at operation 318 that the trajectory received at operation 302 does not meet stop vehicle control mode conditions, at operation 322 the vehicle control system may operate the vehicle in nominal vehicle control mode or otherwise normally.

In examples, an unexpected need to stop the vehicle may be detected and used to modify or generate a trajectory that includes a stopping point. For example, an object may be detected that is predicted to cross the path of the vehicle A vehicle control system may inject or otherwise modify a current trajectory to include a stopping point that brings the vehicle to a stop before the vehicle intersects the object. The vehicle control system may then use this updated trajectory to determine to operate the vehicle in stop vehicle control mode, using a stop vehicle control mode component to generate temporally-based deceleration controls to stop the vehicle at or proximate to the injected stopping point.

Referring again to the example 306, the object 312 may enter the path of the vehicle 308 as the vehicle 308 is traveling along the trajectory 310. In response to detecting the object 312, the vehicle control system of the vehicle 308 may implement rapid deceleration controls to bring the vehicle 308 to a stop at unplanned stopping point 314. Thus, regardless of whether the trajectory 310 is a stopping trajectory or not, and regardless of whether the vehicle 308 would have been operated in stop vehicle control mode or nominal vehicle control mode, the vehicle control system of the vehicle 308 will use rapid deceleration controls to ensure the safety of the passengers of the vehicle 308 and objects outside of the vehicle 308. The alternative control points that may be used in the event that no rapid deceleration is needed are shown in this example as spatial control points (filled dots) and temporal control points (unfilled dots).

FIG. 4 is a block diagram of vehicle control system 400 according to various examples. The system 400 may be implemented at a vehicle (e.g., an autonomous vehicle) by a vehicle computing system and/or by a remote system. The system 400 may include one or more of the components and systems illustrated in FIG. 7 and described below. These components may be configured as described herein or in any other configuration and may perform any subset of their associated operations independently and/or in conjunction with one or more other operations. For example, one or more components and systems can include and/or be implemented using trajectory determination system(s) 732 and/or 752, vehicle tracking system(s) 734 and/or 754, velocity controller(s) 736 and/or 756, processors 716 and/or 744, and/or memories 718 and/or 746 of FIG. 7. In some examples, one or more operations performed by the system 400 may be implemented as a combination of components at a remote system and a vehicle computing system, such as one or more components of vehicle computing device(s) 704 and one or more components of computing device(s) 742 of FIG. 7. However, the system 400 is not limited to being performed by such components and systems, and the components and systems of FIG. 4 are not limited to implementing the system 400.

In various examples, a trajectory determination system 402 may be configured at a vehicle, for example, as part of the vehicle control system 400. The trajectory determination system 402 may be configured to determine a trajectory for use in controlling a vehicle in an environment. This trajectory may be provided to a tracking and/or planning system for use in control of a vehicle. For example, the trajectory determination system 402 may determine, a trajectory 404 (e.g., a spatial trajectory) that may include a lateral profile and a longitudinal profile. These profiles may include data representing spatial points along a path of travel planned for a vehicle. For instance, the longitudinal profile 408 may include acceleration and velocity parameters for such points. The lateral profile may include lateral controls, such as steering controls. The trajectory 404 may further include location data for the points of the trajectory and other data that may be used to determine vehicle control modes and controls for various vehicle components.

The trajectory determination system 402 may provide the trajectory 404 to a rapid deceleration component 410. The rapid deceleration component 410 may be configured to alter the trajectory 404 or otherwise provide rapid deceleration instructions to a vehicle tracking system 412 in the event that rapid deceleration conditions are detected. For example, if the vehicle control system 400 (e.g., the rapid deceleration component 410 of the vehicle control system 400) receives data indicating that an object has entered the current path of the vehicle and/or other urgent or emergency stopping conditions have been detected, the rapid deceleration component 410 may transmit instructions or controls to the vehicle tracking system 412 that cause the vehicle tracking system 412 to implement urgent stopping controls. Such instruction or controls may be integrated into the trajectory 404 and provided to the vehicle tracking system 412 or may be separate from the trajectory 404. Alternatively or additionally, the rapid deceleration component 410 may inject or otherwise modify the trajectory 404 (e.g., based on detected conditions) to include a stopping point (e.g., to avoid an object has entered the current path of the vehicle). The vehicle tracking system 412 may use this stopping point introduced into the trajectory 404 by the rapid deceleration component 410 to determine to operate the vehicle in stop vehicle control mode as described herein. Alternatively or additionally, the rapid deceleration component 410 may transmit stopping instructions or controls (e.g., directly, bypassing the vehicle tracking system 412) to the velocity control 430.

The trajectory 404 may be transmitted to the vehicle tracking system 412 that may be configured with various components that perform vehicle operation mode determinations and generate control based thereon. In examples, the vehicle tracking system 412 may include a projection component 414 that may project vehicle states based on a trajectory and/or other data. For example, the projection component 414 may project, for (e.g., spatial and/or temporal) points in a trajectory, a vehicle's velocity and/or acceleration at those points (anticipated vehicle states and/or controls).

The projected point data generated by the projection component 414 may be used by a stop determination component 416 configured at the vehicle tracking system 412. The stop determination component 416 may be configured to determine a vehicle control mode based on the trajectory 404 and the projected point data generated by the projection component 414. The stop determination component 416 may perform operations as described herein to make this determination, including determining if the trajectory 404 is a stopping trajectory and/or whether spatial points in the trajectory 404 are associated with current and/or projected velocities and/or accelerations that fall at or below the corresponding velocity and acceleration thresholds.

A vehicle control mode determination may be provided by the stop determination component 416 to a vehicle control mode component 418 that may execute or otherwise operate a nominal vehicle control mode component 420 and a stop vehicle control mode component 422.

If the vehicle control mode component 418 determines, based on data received from the stop determination component 416, that the vehicle is to be operated in stop vehicle control mode, the vehicle control mode component 418 may operate the stop vehicle control mode component 422 to generate vehicle control data 424 to control the vehicle. For example, the stop vehicle control mode component 422 may generate temporally-based acceleration and velocity controls for the longitudinal control data 428 of the vehicle control data 424. If the vehicle is being operated in stop vehicle control mode, there may be no change to steering or other lateral controls. Therefore, the stop vehicle control mode component 422 may not generate lateral control data 426 for the vehicle control data 424 and/or may generate the lateral control data 426 to represent the (e.g., unchanged) lateral profile received in the trajectory 404. In examples, the stop vehicle control mode component 422 may generate a vehicle control that includes a velocity and/or an acceleration control and excludes lateral controls.

If the vehicle control mode component 418 determines, based on data received from the stop determination component 416, that the vehicle is not to be operated in stop vehicle control mode, the vehicle control mode component 418 may operate the nominal vehicle control mode component 420 to generate vehicle control data 424 to control the vehicle. For example, the nominal vehicle control mode component 420 may generate spatially-based acceleration and velocity controls for the longitudinal control data 428 of the vehicle control data 424. The nominal vehicle control mode component 420 may also generate the lateral control data 426 of the vehicle control data 424. One or both of the lateral control data 426 and the longitudinal control data 428 may be based on the trajectory 404 and determined using (e.g., primarily) spatial data.

The vehicle control data 424 may be provided to a velocity controller 430 that may be configured to control the various vehicle components that may implement physical operations on the vehicle (e.g., accelerator, motors, brakes, etc.). In examples, the vehicle tracking system 412 may provide the vehicle control data 424 to the velocity controller 430 when and/or where such control data is to be implemented. For example, the vehicle tracking system 412 may transmit spatial control data used in nominal vehicle control mode to the velocity controller when the vehicle is in a location corresponding to the spatial control data. Similarly, the vehicle tracking system 412 may transmit temporal control data used in stop vehicle control mode to the velocity controller at a time corresponding to the temporal control data In examples, the velocity controller may include a standstill vehicle control mode component 432 that may be used when the vehicle control data 424 indicates that the vehicle it to be at zero velocity (e.g., stopped). The velocity controller may detect a zero velocity control in the longitudinal control data 428 and initiate standstill mode by operating the standstill vehicle control mode component 432 to control the vehicle to remain stationary, using the appropriate braking pressure and other means to ensure the vehicle does not roll downhill or otherwise move.

Figure 5:
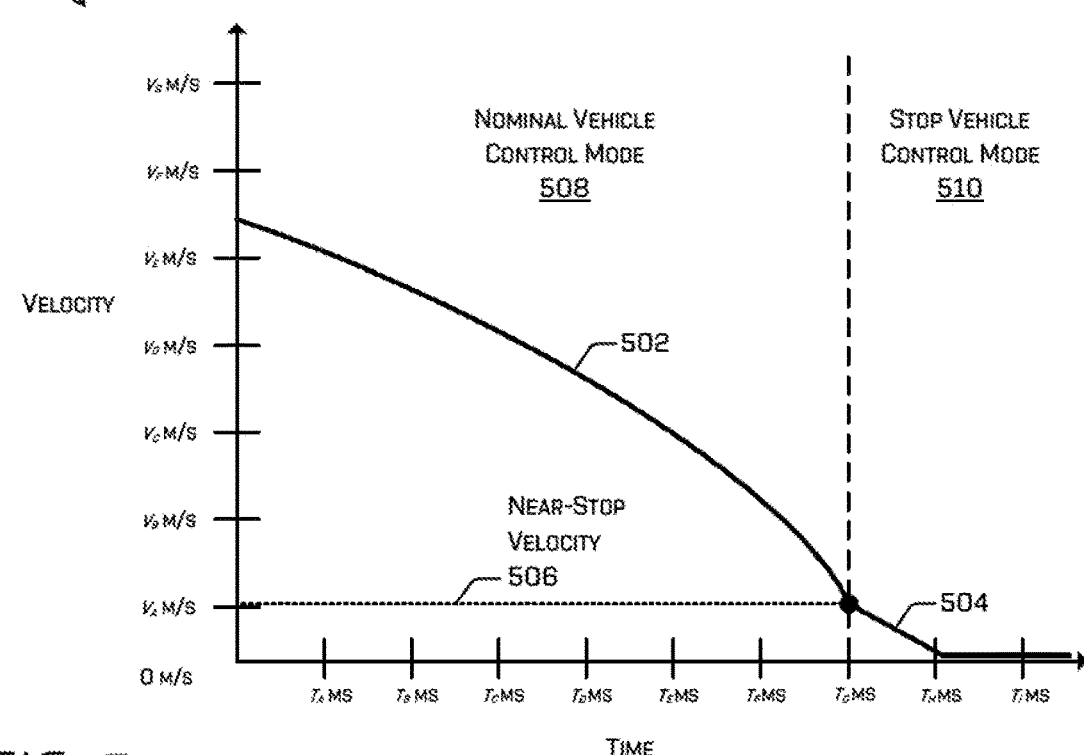
FIG. 5 depicts a graphical representation of velocity rates over time that may be implemented based on the disclosed vehicle control modes, in accordance with examples of the disclosure.

FIG. 5 illustrates a graphical representation 500 of velocity rates 502 and 504 that may be implemented at a vehicle by one or more vehicle control systems based on vehicle control modes as described herein. As shown here, the velocity v of a vehicle may be decreasing (e.g., approaching zero velocity) over time t as shown by the plot of velocity rate 502. This decrease in velocity may be the result of the controls implemented by a vehicle control system based on a stopping trajectory. The vehicle may be operated in nominal vehicle control mode, using velocity controls based on spatial data determined from the trajectory and indicated as section 508.

The vehicle control system may be monitoring or otherwise receiving data indicating a current vehicle velocity. When the vehicle control system determines that the velocity of the vehicle has met or fallen below the near-stop velocity threshold 506, the vehicle control system may control the vehicle in stop vehicle control mode, indicated as section 510 in this figure with velocity rates 504. In examples, one or more other conditions may have to be met in order to enter stop vehicle control mode, such as the trajectory being a stopping trajectory and the (e.g., current) acceleration being at or below a maximum stopping acceleration threshold. In this mode, as described herein, the vehicle control system may determine velocity controls for the vehicle based on temporal data. As shown here, the use of temporal data may allow for more granular velocity control and gradual slowing of the vehicle, which may improve passenger comfort when stopping.

Figure 6:
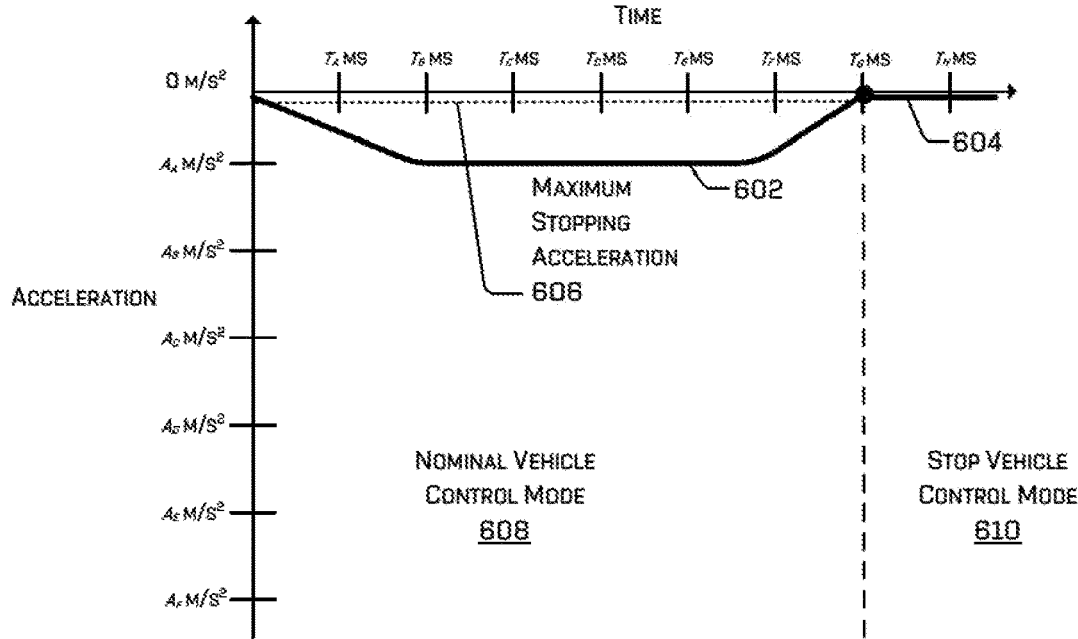
FIG. 6 depicts a graphical representation of acceleration rates over time that may be implemented based on the disclosed vehicle control modes, in accordance with examples of the disclosure.

FIG. 6 illustrates a graphical representation 600 of acceleration rates that may be implemented at a vehicle by one or more vehicle control systems based on vehicle control modes as described herein. As shown here, the acceleration a of a vehicle may be decreasing (e.g., becoming more negative) and increasing (e.g., becoming less negative) over time t as shown in acceleration rates 602. This decrease and increase in acceleration may be the result of the controls implemented by a vehicle control system based on a stopping trajectory. In examples, this change of acceleration over time may increase the comfort of passengers while slowing the vehicle. The vehicle may be operated in nominal vehicle control mode, using acceleration controls based on spatial data determined from the trajectory and indicated as section 608.

The vehicle control system may be monitoring or otherwise receiving data indicating a current vehicle acceleration. When the vehicle control system determines that the acceleration of the vehicle has met or fallen below the maximum stopping acceleration threshold 606 (e.g., zero or approximately zero), the vehicle control system may control the vehicle in stop vehicle control mode, indicated as section 610 in this figure with velocity rates 604. In examples, one or more other conditions may have to be met in order to enter stop vehicle control mode, such as the trajectory being a stopping trajectory and the (e.g., current) velocity being at or below a near-stop velocity threshold. In this mode, as described herein, the vehicle control system may determine acceleration controls for the vehicle based on temporal data. As shown here, the use of temporal data may allow for more consistent acceleration control and gradual slowing of the vehicle, which may improve passenger comfort when stopping.

FIG. 7 depicts a block diagram of an example system 700 for implementing the techniques described herein. In at least one example, the system 700 can include a vehicle 702. The vehicle 702 can include a vehicle computing system or device 704 that may function as and/or perform the functions of a vehicle controller for the vehicle 702. The vehicle 702 can also include one or more sensor systems 706, one or more emitters 708, one or more communication connections 710, at least one direct connection 712, and one or more drive systems 714.

The vehicle computing device 704 can include one or more processors 716 and memory 718 communicatively coupled with the one or more processors 716. In the illustrated example, the vehicle 702 is an autonomous vehicle; however, the vehicle 702 could be any other type of vehicle. In the illustrated example, the memory 718 of the vehicle computing device 704 stores a localization component 720, a perception component 722, a planning component 724, one or more system controllers 726, one or more maps 728, a prediction component 730, one or more trajectory determination systems 732, one or more vehicle tracking systems 734, and/or one or more velocity controllers 736. Though depicted in FIG. 7 as residing in memory 718 for illustrative purposes, it is contemplated that each of the localization component 720, the perception component 722, the planning component 724, the one or more system controllers 726, the one or more maps 728, the prediction component 730, the trajectory determination system(s) 732, the vehicle tracking system(s) 734, and/or the velocity controller(s) 736 can additionally, or alternatively, be accessible to the vehicle 702 (e.g., stored remotely). Alternatively or additionally, the trajectory determination system(s) 732, the vehicle tracking system(s) 734, and/or the velocity controller(s) 736 may be a component of and/or associated with a remote computing device and/or a separate (e.g., secondary) computing device.

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for generating map data, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 722 can provide processed sensor data that indicates one or more characteristics associated with a detected entity (e.g., a tracked object) and/or the environment in which the entity is positioned. The perception component 722 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 724 can determine a path for the vehicle 702 to follow to traverse through an environment. In examples, the planning component 724 can determine various routes and trajectories and various levels of detail. For example, the planning component 724 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In at least one example, the vehicle computing device 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

The memory 718 can further include one or more maps 728 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 728 can include at least one map (e.g., images and/or a mesh). In some examples, the vehicle 702 can be controlled based at least in part on the maps 728. That is, the maps 728 can be used in connection with the localization component 720, the perception component 722, and/or the planning component 724 to determine a location of the vehicle 702, identify objects in an environment, and/or generate routes and/or trajectories to navigate within an environment.

In some examples, the one or more maps 728 can be stored on a remote computing device(s) (such as the computing device(s) 742) accessible via network(s) 740. In some examples, multiple maps 728 can be stored based on, for example, a characteristic (e.g., type of entity, time of day, day of week, season of the year, etc.). Storing multiple maps 728 can have similar memory requirements but increase the speed at which data in a map can be accessed.

In general, the prediction component 730 can generate predicted trajectories of objects in an environment. For example, the prediction component 730 can generate one or more predicted trajectories for vehicles, pedestrians, animals, and the like within a threshold distance from the vehicle 702. In some instances, the prediction component 730 can measure a trace of an object and generate a trajectory for the object based on observed and predicted behavior. The prediction component 730 may interact with the trajectory determination system(s) 732, the vehicle tracking system(s) 734, and/or the velocity controller(s) 736 to determine an operational trajectory, for example, based on one or more candidate trajectories.

In some instances, aspects of some or all of the components discussed herein can include any models, algorithms, and/or machine learning algorithms. For example, in some instances, the components in the memory 718 (and the memory 746, discussed below) can be implemented as a neural network. For instance, the memory 718 may include a deep tracking network that may be configured with a convolutional neural network (CNN). The CNN may include one or more convolution/deconvolution layers. Alternatively or additionally, the trajectory determination system(s) 732, the vehicle tracking system(s) 734, and/or the velocity controller(s) 736 may include or be implemented by a CNN that may perform operations as described herein.

An example neural network is an algorithm that passes input data through a series of connected layers to produce an output. Each layer in a neural network can also comprise another neural network or can comprise any number of layers, each of which may be convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a braking trajectory. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 706 can include multiple instances of each of these or other types of sensors. For instance, the camera sensors can include multiple cameras disposed at various locations about the exterior and/or interior of the vehicle 702. The sensor system(s) 706 can provide input to the vehicle computing device 704. Additionally, or alternatively, the sensor system(s) 706 can send sensor data, via the one or more networks 740, to the one or more computing device(s) at a particular frequency, after a lapse of a predetermined period of time, in near real-time, etc.

The vehicle 702 can also include one or more emitters 708 for emitting light (visible and/or non-visible) and/or sound. The emitter(s) 708 in an example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device 704 to another computing device or a network, such as network(s) 740. For example, the communications connection(s) 710 can enable Wi-Fi-based communication such as via frequencies defined by the IEEE 802.11 standards, short-range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller that can receive and preprocess data from the sensor system(s) and to control operation of the various vehicle systems. In some examples, the drive system controller can include one or more processors and memory communicatively coupled with the one or more processors.

The memory can store one or more components to perform various functionalities of the drive system(s) 714. Furthermore, the drive system(s) 714 may also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In some examples, the vehicle 702 can send sensor data, audio data, collision data, and/or other types of data to one or more computing device(s) 742 via the network(s) 740. In some examples, the vehicle 702 can send raw sensor data to the computing device(s) 742. In other examples, the vehicle 702 can send processed sensor data and/or representations of sensor data (e.g., multichannel data structures representing sensor data) to the computing device(s) 742. In some examples, the vehicle 702 can send sensor data to the computing device(s) 742 at a particular frequency, after a lapse of a predetermined period of time, in near real-time, etc. In some cases, the vehicle 702 can send sensor data (raw or processed) to the computing device(s) 742 as one or more log files.

The computing device(s) 742 can include processor(s) 744 and a memory 746 storing one or more perception components 748, planning components 750, one or more trajectory determination systems 752, one or more vehicle tracking systems 754, and/or one or more velocity controllers 756. In some instances, the trajectory determination system(s) 752, the vehicle tracking system(s) 754, and/or the velocity controller(s) 756 can substantially correspond to the trajectory determination system(s) 732, the vehicle tracking system(s) 734, and/or the velocity controller(s) 436, respectively, and can include substantially similar functionality. In some instances, the perception component 748 can substantially correspond to the perception component 722 and can include substantially similar functionality. In some instances, the planning component 750 can substantially correspond to the planning component 724 and can include substantially similar functionality.

The processor(s) 716 of the vehicle 702 and the processor(s) 744 of the computing device(s) 742 can be any suitable processor capable of executing instructions to process data and perform operations as described herein. By way of example and not limitation, the processor(s) 716 and 744 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 746 are examples of non-transitory computer-readable media. The memory 718 and 746 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 742 and/or components of the computing device(s) 742 can be associated with the vehicle 702. That is, the vehicle 702 can perform one or more of the functions associated with the computing device(s) 742, and vice versa.

EXAMPLE CLAUSES

The following paragraphs describe various examples. Any of the examples in this section may be used with any other of the examples in this section and/or any of the other examples or embodiments described herein.

A: A system comprising one or more processors; and one or more non-transitory computer-readable media storing instructions executable by the one or more processors, wherein the instructions, when executed, cause the system to perform operations comprising: receiving, from a trajectory determination system, a trajectory for a vehicle to traverse through an environment, the trajectory determined based at least in part on a plurality of spatial points, a spatial point of the plurality of spatial points indicative of a location for implementing a first vehicle control; determining that a first velocity associated with the spatial point meets or falls below a velocity threshold; determining that a first acceleration associated with the spatial point meets or falls below an acceleration threshold; determining that a subset of the plurality of spatial points is associated with a stopping maneuver; based at least in part on determining that the first velocity meets or falls below the velocity threshold, the first acceleration meets or falls below the acceleration threshold, and the subset of the plurality of spatial points being associated with the stopping maneuver, determining a plurality of temporal points along the trajectory, a temporal point of the plurality of temporal points indicative of a time for implementing a second vehicle control; and causing the vehicle to be controlled in accordance with second vehicle control.

B: The system of paragraph A, wherein the operations further comprise: determining a distance between a first location of a predicted vehicle stopping point and a second location associated with the stopping maneuver; and modifying one or more controls associated with the plurality of temporal points based at least in part on the distance.

C: The system of paragraph B, wherein modifying the one or more controls based at least in part on the distance comprises determining that the distance is greater than a threshold distance.

D: The system of paragraph B, wherein modifying the one or more controls based at least in part on the distance comprises decreasing an acceleration control associated with the temporal point.

E: The system of any of paragraph A-D, wherein determining that the subset of the plurality of spatial points is associated with a stopping maneuver comprises determining that a second spatial point of the plurality of spatial points is associated with a zero velocity.

F: One or more non-transitory computer-readable media storing instructions that, when executed by one or more processors, perform operations comprising: receiving a trajectory for controlling a vehicle; controlling the vehicle in a spatial vehicle control mode based at least in part on the trajectory; determining a plurality of points along the trajectory, a first point of the plurality of points indicative of a spatial location for implementing a vehicle control; determining that a velocity parameter associated with the first point of the plurality of points meets or falls below a velocity threshold; determining that a second point of the plurality of points is associated with a zero velocity; based at least in part on determining that the velocity parameter meets or falls below the velocity threshold and that the second point is associated with the zero velocity, controlling the vehicle in a temporal vehicle control mode.

G: The one or more non-transitory computer-readable media of paragraph F, wherein controlling the vehicle in the temporal vehicle control mode comprises: determining a time for implementing a second vehicle control; and transmitting the second vehicle control to a velocity controller at the time.

H: The one or more non-transitory computer-readable media of paragraph F or G, wherein the operations further comprise: determining that a current spatial location of the vehicle is at the second point; and based at least in part on determining that the current spatial location of the vehicle is at the second point, controlling the vehicle to remain stationary.

I: The one or more non-transitory computer-readable media of paragraph H, wherein determining that the current spatial location of the vehicle is at the second point comprises determining that a distance between the current spatial location and the second point is less than a threshold distance.

J: The one or more non-transitory computer-readable media of any of paragraphs F-I, wherein the operations further comprise determining a plurality of controls corresponding to a plurality of times between a current time and a projected time associated with the second point.

K: The one or more non-transitory computer-readable media of paragraph J, wherein the plurality of controls comprises at least one of an acceleration control or a velocity control.

L: The one or more non-transitory computer-readable media of any of paragraphs F-K, wherein determining that the second point is associated with the zero velocity comprises determining that no points spatially subsequent to the second point are associated with a non-zero velocity.

M: The one or more non-transitory computer-readable media of any of paragraphs F-L, wherein the operations further comprise: receiving a second trajectory for controlling the vehicle; determining a second plurality of points along the second trajectory, a third point of the second plurality of points indicative of a second spatial location for implementing a third vehicle control; determining that no velocity parameter associated with the second plurality of points meets or falls below the velocity threshold; and controlling the vehicle in accordance with the second trajectory.

N: The one or more non-transitory computer-readable media of any of paragraphs F-M, wherein the operations further comprise modifying the trajectory to include the second point.

O: A method comprising: receiving a trajectory for controlling a vehicle; determining a plurality of spatial points along the trajectory, a first spatial point of the plurality of spatial points indicative of a first vehicle control; determining that a velocity parameter associated with the first spatial point of the plurality of spatial points meets or falls below a threshold; determining that a second spatial point of the plurality of spatial points is associated with a zero velocity; based at least in part on determining that the velocity parameter meets or falls below the threshold and that the second spatial point is associated with the zero velocity, determining a time for implementing a second vehicle control; and controlling the vehicle by implementing the second vehicle control at the time.

P: The method of paragraph O, wherein the second vehicle control excludes lateral controls.

Q: The method of paragraph O or P, further comprising determining that an acceleration parameter associated with the first spatial point meets or falls below a second threshold, wherein the time is further determined based at least on part on determining that the acceleration parameter meets or falls below a second threshold.

R: The method of any of paragraphs O-Q, further comprising determining a plurality of controls corresponding to a plurality of times between a current time and a projected time associated with the second spatial point.

S: The method of paragraph R, further comprising modifying the trajectory to include the second spatial point based at least in part on sensor data.

T: The method of paragraph R, further comprising modifying the trajectory to include the second spatial point based at least in part on detection of an object.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more non-transitory computer-readable media storing instructions executable by the one or more proces- sors, wherein the instructions, when executed, cause the system to perform operations comprising:

receiving, from a trajectory determination system, a trajectory for a vehicle to traverse through an environment, the trajectory determined based at least in part on a plurality of spatial points, a first spatial point of the plurality of spatial points indicative of a first location for implementing a first vehicle control and a second spatial point of the plurality of spatial points indicative of a second location for implementing a second vehicle control;

causing the vehicle to be controlled by implementing the first vehicle control at the first location and the second vehicle control at the second location;

determining that a first velocity associated with a third spatial point of the plurality of spatial points meets or falls below a velocity threshold;

determining that a first acceleration associated with the third spatial point meets or falls below an acceleration threshold;

determining that a subset of the plurality of spatial points is associated with a stopping maneuver;

based at least in part on determining that the first velocity meets or falls below the velocity threshold, the first acceleration meets or falls below the acceleration threshold, and the subset of the plurality of spatial points being associated with the stopping maneuver, determining a plurality of temporal points along the trajectory, a first temporal point of the plurality of temporal points indicative of a first time for implementing a third vehicle control and a second temporal point of the plurality of temporal points indicative of a second time, subsequent to the first time, for implementing a fourth vehicle control; and causing the vehicle to be controlled by implementing the third vehicle control at the first time and the fourth vehicle control at the second time.

2. The system of claim 1, wherein the operations further comprise:

determining a distance between a third location of a predicted vehicle stopping point and a fourth location associated with the stopping maneuver; and modifying one or more controls associated with the plurality of temporal points based at least in part on the distance.

3. The system of claim 2, wherein modifying the one or more controls based at least in part on the distance comprises determining that the distance is greater than a threshold distance.

4. The system of claim 2, wherein modifying the one or more controls based at least in part on the distance comprises decreasing an acceleration control associated with the first temporal point.

5. The system of claim 1, wherein determining that the subset of the plurality of spatial points is associated with a stopping maneuver comprises determining that a fourth spatial point of the plurality of spatial points is associated with a zero velocity.

6. One or more non-transitory computer-readable media storing instructions that, when executed by one or more processors, perform operations comprising:

receiving a trajectory for controlling a vehicle comprising a plurality of spatial points, a first spatial point of the plurality of spatial points indicative of a first spatial location for implementing a first vehicle control;

controlling the vehicle in a spatial vehicle control mode based at least in part on the trajectory by implementing the first vehicle control at the first spatial location;

determining that a velocity parameter associated with a second spatial point of the plurality of spatial points meets or falls below a velocity threshold;

determining that a third spatial point of the plurality of spatial points is associated with a zero velocity;

based at least in part on determining that the velocity parameter meets or falls below the velocity threshold and that the third spatial point is associated with the zero velocity, determining a temporal point along the trajectory indicative of a time for implementing a second vehicle control; and controlling the vehicle by implementing the second vehicle control at the time.

7. The one or more non-transitory computer-readable media of claim 6, wherein controlling the vehicle by implementing the second vehicle control at the time comprises:

transmitting the second vehicle control to a velocity controller at the time.

8. The one or more non-transitory computer-readable media of claim 6, wherein the operations further comprise:

determining that a current spatial location of the vehicle is at the third spatial point; and based at least in part on determining that the current spatial location of the vehicle is at the third spatial point, controlling the vehicle to remain stationary.

9. The one or more non-transitory computer-readable media of claim 8, wherein determining that the current spatial location of the vehicle is at the third spatial point comprises determining that a distance between the current spatial location and the third spatial point is less than a threshold distance.

10. The one or more non-transitory computer-readable media of claim 6, wherein the operations further comprise determining a plurality of controls corresponding to a plurality of times between a current time and a projected time associated with the third spatial point.

11. The one or more non-transitory computer-readable media of claim 10, wherein the plurality of controls comprises at least one of an acceleration control or a velocity control.

12. The one or more non-transitory computer-readable media of claim 6, wherein determining that the third spatial point is associated with the zero velocity comprises determining that no points spatially subsequent to the third spatial point are associated with a non-zero velocity.

13. The one or more non-transitory computer-readable media of claim 6, wherein the operations further comprise:

receiving a second trajectory for controlling the vehicle;

determining a second plurality of spatial points along the second trajectory, a third spatial point of the second plurality of spatial points indicative of a second spatial location for implementing a third vehicle control;

determining that no velocity parameter associated with the second plurality of spatial points meets or falls below the velocity threshold; and controlling the vehicle in accordance with the second trajectory.

14. The one or more non-transitory computer-readable media of claim 6, wherein the operations further comprise modifying the trajectory to include the temporal point.

15. A method comprising:

receiving a trajectory for controlling a vehicle comprising a plurality of spatial points, a first spatial point of the plurality of spatial points indicative of a first location for implementing a first vehicle control;

controlling the vehicle based at least in part on the trajectory by implementing the first vehicle control at the first location;

determining that a velocity parameter associated with a second spatial point of the plurality of spatial points meets or falls below a threshold;

determining that a third spatial point of the plurality of spatial points is associated with a zero velocity;

based at least in part on determining that the velocity parameter meets or falls below the threshold and that the third spatial point is associated with the zero velocity, determining a temporal point along the trajectory indicative of a time for implementing a second vehicle control; and controlling the vehicle by implementing the second vehicle control at the time.

16. The method of claim 15, wherein the second vehicle control excludes lateral controls.

17. The method of claim 15, further comprising determining that an acceleration parameter associated with the second spatial point meets or falls below a second threshold, wherein the time is further determined based at least on part on determining that the acceleration parameter meets or falls below a second threshold.

18. The method of claim 15, further comprising determining a plurality of controls corresponding to a plurality of times between a current time and a projected time associated with the third spatial point.

19. The method of claim 18, further comprising modifying the trajectory to include the third spatial point based at least in part on sensor data.

20. The method of claim 18, further comprising modifying the trajectory to include the third spatial point based at least in part on detection of an object.

* * * * *